United States Patent
Siddiqui et al.

(10) Patent No.: US 11,677,694 B2
(45) Date of Patent: Jun. 13, 2023

(54) SYSTEM AND METHOD FOR CONVERTING AN EMAIL THREAD TO AN INSTANT MESSAGE GROUP

(71) Applicant: Microsoft Technology Licensing, LLC, Redmond, WA (US)

(72) Inventors: Afraz A. Siddiqui, Monroe, NJ (US); John J. Lotito, Jersey City, NJ (US); Joshua Bouckenooghe, Bothell, WA (US); Thomas Charles Underhill, Oslo (NO); Erin Woo, Alameda, CA (US); Allison Bellew Sousa, Boulder, CO (US); Peter Nagy, New York, NY (US); Arnaud Vallat, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/336,609

(22) Filed: Jun. 2, 2021

(65) Prior Publication Data
US 2022/0393996 A1 Dec. 8, 2022

(51) Int. Cl.
*G06F 15/16* (2006.01)
*H04L 51/046* (2022.01)
(Continued)

(52) U.S. Cl.
CPC .......... *H04L 51/046* (2013.01); *H04L 51/216* (2022.05); *H04L 51/226* (2022.05); *H04L 51/42* (2022.05)

(58) Field of Classification Search
CPC ....... H04L 51/046; H04L 51/16; H04L 51/22; H04L 51/26
(Continued)

(56) References Cited

U.S. PATENT DOCUMENTS

| | | | | |
|---|---|---|---|---|
| 7,219,303 | B2* | 5/2007 | Fish | H04L 67/52 715/741 |
| 7,266,776 | B2* | 9/2007 | Quillen | H04L 67/22 715/847 |

(Continued)

FOREIGN PATENT DOCUMENTS

EP 1657871 A1 5/2006

OTHER PUBLICATIONS

Joseph, Brownell, "Start a Group Conversation in Outlook: Overviewv", Retrieved from: https://www.teachucomp.com/start-a-group-conversation-in-outlook-instructions/, Nov. 2, 2020, 11 Pages.

(Continued)

*Primary Examiner* — Alicia Baturay

(57) ABSTRACT

Systems and methods for initiating an instant messaging chat session from an email thread are described. In examples, an email thread including at least one email is received and user identifiers form the at least one email are extracted. Presence information associated with each user identifier of the plurality of user identifiers is obtained and then ordered. The ordered plurality of user identifiers together with their presence information are displayed in a user interface window. A determination to display a user control associated with an instant messaging capability is based on the presence information associated with at least one user identifier of the plurality of user identifiers. Upon receiving an indication that the user control associated with the instant messaging chat capability is selected, an instant messaging chat session is initiated.

19 Claims, 12 Drawing Sheets

(51) Int. Cl.
    *H04L 51/42*     (2022.01)
    *H04L 51/216*     (2022.01)
    *H04L 51/226*     (2022.01)

(58) Field of Classification Search
    USPC .......................................................... 709/206
    See application file for complete search history.

(56) References Cited

U.S. PATENT DOCUMENTS

| | | | | |
|---|---|---|---|---|
| 7,558,828 | B1* | 7/2009 | Panzer | H04L 67/535 |
| | | | | 709/205 |
| 7,853,668 | B2* | 12/2010 | Daniell | H04L 51/16 |
| | | | | 715/752 |
| 8,037,141 | B2 | 10/2011 | Daniell | |
| 8,086,672 | B2* | 12/2011 | Horvitz | H04L 51/56 |
| | | | | 709/224 |
| 8,224,915 | B2 | 7/2012 | Malik et al. | |
| 8,244,815 | B1* | 8/2012 | Panzer | H04L 51/42 |
| | | | | 709/204 |
| 8,255,811 | B2* | 8/2012 | Lynn | H04M 1/2746 |
| | | | | 715/753 |
| 8,583,741 | B2* | 11/2013 | Perlow | G06Q 10/107 |
| | | | | 709/206 |
| 8,635,166 | B1* | 1/2014 | Agrawal | G06F 16/7867 |
| | | | | 709/229 |
| 8,903,922 | B2 | 12/2014 | Wyatt | |
| 8,990,189 | B2* | 3/2015 | Kennedy | G06Q 10/1053 |
| | | | | 707/723 |
| 9,219,809 | B2* | 12/2015 | Lynn | H04M 1/7243 |
| 10,205,695 | B2 | 2/2019 | Snider et al. | |
| 10,915,866 | B2 | 2/2021 | Bay et al. | |
| 10,931,608 | B2 | 2/2021 | Olivera et al. | |
| 2002/0065887 | A1* | 5/2002 | Paik | G06Q 30/0277 |
| | | | | 709/205 |
| 2004/0172456 | A1* | 9/2004 | Green | G06F 3/04842 |
| | | | | 709/207 |
| 2004/0193722 | A1* | 9/2004 | Donovan | H04L 51/066 |
| | | | | 709/206 |
| 2008/0030496 | A1 | 2/2008 | Lee et al. | |
| 2011/0029629 | A1 | 2/2011 | Burtner et al. | |
| 2012/0259937 | A1 | 10/2012 | Malik et al. | |
| 2013/0238728 | A1 | 9/2013 | Fleck et al. | |
| 2013/0311573 | A1* | 11/2013 | Stensmo | G06Q 30/0641 |
| | | | | 709/204 |
| 2013/0311592 | A1* | 11/2013 | Stoll | H04L 67/10 |
| | | | | 709/206 |
| 2013/0311621 | A1* | 11/2013 | Tyson | H04L 51/046 |
| | | | | 709/219 |
| 2016/0323235 | A1* | 11/2016 | Lindsay | H04L 51/04 |
| 2019/0007362 | A1* | 1/2019 | Shmunis | H04L 51/046 |

OTHER PUBLICATIONS

"International Search Report and Written Opinion Issued in PCT Application No. PCT/US22/028248", dated Aug. 24, 2022, 11 Pages.

* cited by examiner

SYSTEM AND METHOD FOR CONVERTING AN EMAIL THREAD TO AN INSTANT MESSAGE GROUP

BACKGROUND

The debate about using email vs instant messaging is a hot item. Instant messages provide users with real-time collaboration, file sharing, and in the moment responses when needed. That is, instant messages are instant meaning instant messages are received immediately whenever a recipient is online. Instant messages tend to be more responsive as they are more similar to communicating face-to-face or via a phone call than emails. In many instances, instant messages are meant to be brief. For example, there is a big difference between answering whether or not you will be able to join a person for lunch vs providing details related to the latest design meeting. Emails have a level of formality that instant messages do not. While an email may be a flawed method to send a casual reminder or ask a quick question, it is a valid choice when it comes to setting up an interview, making a first contact with a new client, and/or sending a contract or other documents. Emails tend to leave a solid paper trail as they are easier to archive and track, which may be important for more formal conversations.

In some instances where multiple people are replying on an email thread, a user may desire to quickly create an instant message group to chat with all participants (for example, if the thread is getting long and one wants to have more fluid conversation) with context intelligently carried over. However, to do this, one needs to go and manually create an instant messaging group, add all participants to the group, and begin the conversation to set context and possibly add a group title for added context as well. In some instances, the creation of the instant messaging group may be all for not if other participants are not available or do not have availability to participate in the instant messaging session. It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, system and methods are described that provide a user desiring to communicate via an instant message, tools, and resources to determine whether such communication would be more beneficial than over an email. For example, to setup an instant messaging session from an email, one should be able to simply tap a button in an email thread such that a group chat in an instant messaging application is automatically created, all participants are added, and the group chat is named using the Subject of email. In some examples, the first message may be sent to group chat participants, where the first message would be the last reply on the email thread so group members have context.

In examples, all users on an email thread are identified and the eligibility of participants to be added to a messaging group is determined. In addition, the availability of participants via presence information may be provided to one or more participants in the email thread such that participants are made aware as to those participants that may be available to take part in the instant messaging chat session and those participants that are unavailable prior to initiating the instant messaging chat session. Thus, the conversation from email messaging to a more fluid conversation via an instant messaging chat session appears to be seamless.

In some examples, the option to initiate an instant messaging chat session may be determined based on one or more contextual factors associated with the email thread. For example, factors like length of conversation, confidentiality of topics discussed, online availability of participants, and others are factored into determining if a "start chat" functionality in a user interface window will be displayed to a participant. In addition, if an email thread of five participants ends up turning into mail messages primarily being exchanged between two individuals, a "start chat" functionality may be displayed at user interface windows of the two individuals and not at user interface windows of other participants.

In accordance with at least one aspect of the present disclosure, a method for initiating an instant messaging chat session from an email thread including at least one email is described. The method may include receiving an email thread including at least one email; extracting a plurality of user identifiers from the at least one email; obtaining presence information associated with each user identifier of the plurality of user identifiers; ordering the plurality of user identifiers based on the presence information associated with each user identifier of the plurality of user identifiers; causing display of the ordered plurality of user identifiers together with an indication of the presence information associated with each user identifier; evaluating criteria to determine whether to display a user control associated with an instant messaging capability, wherein the criteria includes the presence information associated with at least one user identifier of the plurality of user identifiers; and in response to a selection of the user control, initiating a session of an instant messaging application with at least one user associated with the at least one user identifier.

In accordance with at least one aspect of the present disclosure, a system for initiating an instant messaging chat session from an email thread including at least one email is described. The system may include a processor; and memory including instructions which when executed by the processor, cause the processor to: receive an email thread including at least one email; extract a plurality of user identifiers from the at least one email; obtain presence information associated with each user identifier of the plurality of user identifiers; order the plurality of user identifiers based on the presence information associated with each user identifier of the plurality of user identifiers; cause display of the ordered plurality of user identifiers together with an indication of the presence information associated with each user identifier; evaluate criteria to determine whether to display a user control associated with an instant messaging capability, wherein the criteria includes the presence information associated with at least one user identifier of the plurality of user identifiers and at least one of a an email reply frequency, a number of user identifiers associated with the email thread, or a topic derived from contents of the at least one email; and in response to a selection of the user control, initiate a session of an instant messaging application with at least one user associated with the at least one user identifier In accordance with at least one aspect of the present disclosure, a computer-readable storage medium is described. The computer-readable storage medium may include instructions, which when executed by a processor, cause the processor to: receive an email thread including at least one email; extract a plurality of user identifiers from the at least one email; obtain presence information associated with each user identifier of the plurality of user identifiers; order the plurality of user identifiers based on the presence information associated with each user identifier of the plurality of user identifiers; cause display of the ordered plurality of user identifiers together with an indication of the presence information associated with each user identifier; evaluate criteria to determine whether to display a user control associated with an instant messaging capability, wherein the criteria includes the presence information associated with at least one user identifier of the plurality of user identifiers; and in response to a selection of the user control, initiate a session of an instant messaging application with at least one user associated with the at least one user identifier.

In accordance with at least one aspect of the present disclosure, a system for initiating an instant messaging chat session from an email thread including at least one email is described. The system may include a processor; and memory including instructions which when executed by the processor, cause the processor to: receive an email thread including at least one email message; cause display of a user control associated with an instant messaging capability; in response to a selection of the user control: extract a plurality of parameters from the email thread; generate a deep link including the plurality of extracted parameters; and initiate a session of an instant messaging application based on the plurality of extracted parameters included in the deep link, wherein at least one parameter of the plurality of extracted parameters includes a subject parameter extracted from the email thread, and a session group name of the initiated session of the instant messaging application includes the subject parameter.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations, specific embodiments, or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
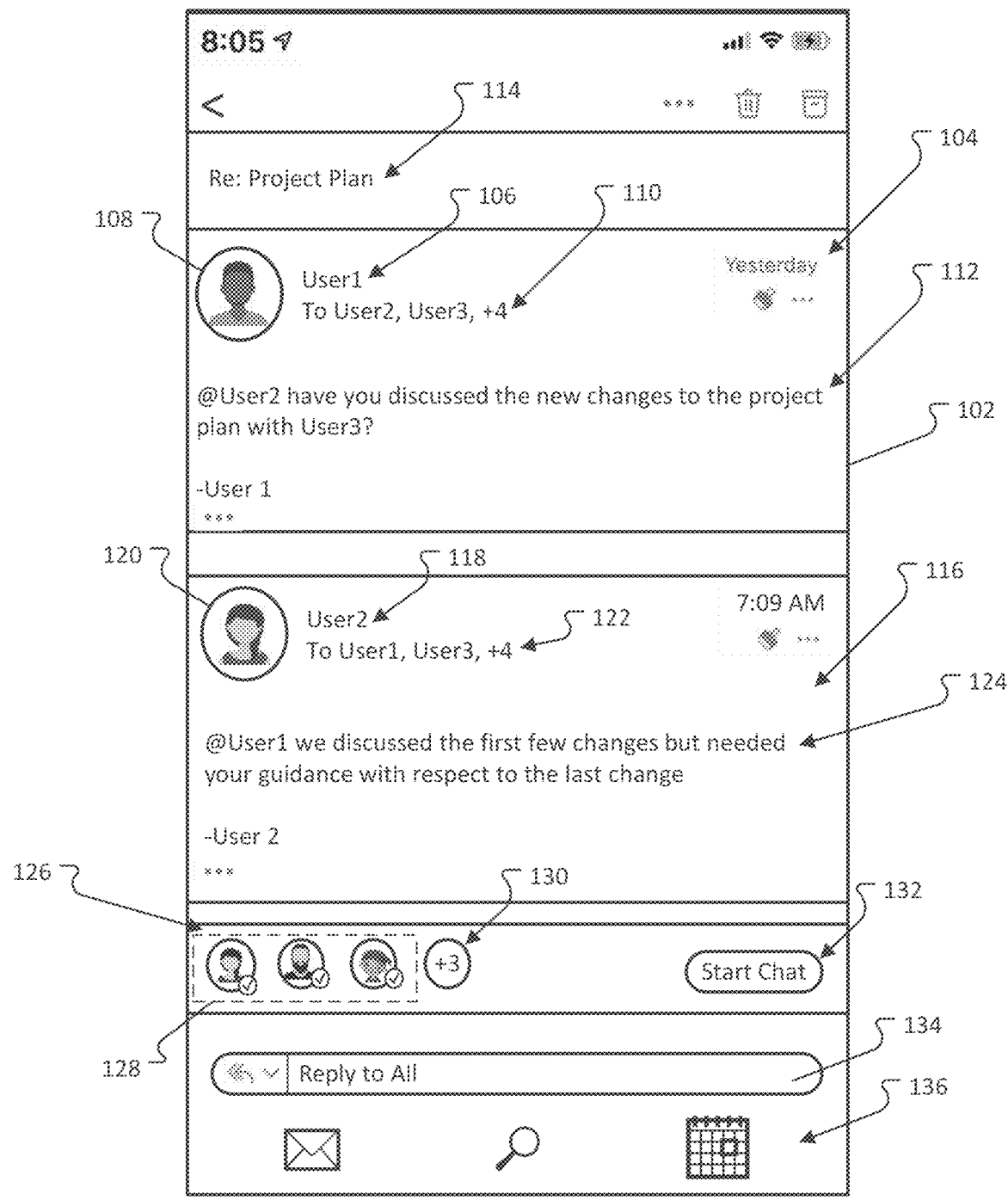
FIG. 1 depicts details of a user interface window including email content in accordance with examples of the present disclosure.

FIG. 1 depicts details of a user interface window 102 including email content in accordance with examples of the present disclosure. The user interface window 102 may correspond to an email thread such that an email conversation history is included in the user interface window 102. In examples, the user interface window 102 displays a first message 104 in a first portion of the user interface window 102, where the first message 104 may include or otherwise display a user identifier 106 associated with a first user or first participant, an avatar or image 108 associated with the first user or first participant, one or more user identifiers 110 associated with other users or other participants, and message contents 112. In examples, the user identifier 106 is associated with a user, or participant, that composed or otherwise authored the first message 104. For example, the user identifier 106 associated with the first user identifies the author of the first message 104. Similarly, the one or more user identifiers 110 are associated with one or more users, or one or more participants, to which the first message 104 is addressed. In examples, the one or more user identifiers 106 may be in a "From:" field and the one or more user identifiers 110 may be in a "To:", "CC:", or "BCC:" field. In examples where multiple user identifiers are included in the one or more user identifiers 106, less than all of the user identifiers 106 may be displayed. For example, another indication, such as "+4" may be displayed instead. The another indication, such as but not limited to "+4" may be displayed as an image or text. In examples, the user identifier 106 and the one or more user identifiers 110 may be associated with an email address, a username, or other identifier uniquely identifying a user. In addition, the user identifier 106 and/or the one or more user identifiers 110 may be associated with a grouping, such as but not limited to a project group, a permission group, or other type of grouping having some unifying relationship. In accordance with examples of the present disclosure, the user interface window 102 may also include a subject 114 associated with the first message 104, where the subject 114 may be associated with or otherwise defined by the first user or one or more other users associated with the first message 104.

In examples, the user interface window 102 displays a second message 116 in a second portion of the user interface window 102, where the second message 116 may include or otherwise display a user identifier 118 associated with a second user, an avatar or image 120 associated with the second user, one or more user identifiers 122 associated with other users, and message contents 124. In examples, the user identifier 118 is associated with a user that composed the second message 116. For example, the user identifier 118 associated with the second user identifies the author of the second message 116. Similarly, the one or more user identifiers 122 are associated with one or more users to which the second message 116 is addressed. In examples, the user identifier 118 may be in a "From:" field and the one or more user identifiers 122 may be in a "To:", "CC:", or "BCC:" field. In accordance with examples of the present disclosure, the second message 116 is a reply to the first message 104 such that the first message 104 and the second message 116 comprise an email thread. In some examples, the email thread may include a single message; in other examples, the email thread may include more than one message.

In accordance with examples of the present disclosure, the user interface window 102 may display a window portion 126 associated with initiating an instant messaging chat session involving one or more of participants of the email thread including the first message 104 and the second message 116. The window portion 126 may display avatars 128 indicative of one or more users currently available to chat, whereas other users not available to chat may be grouped into another indication, such as the "+3" indication. The window portion 126 may include a "start chat" control 132 such that a user, or participant, that is a recipient of one or more of the first message 104 or second message 116 may initiate an instant messaging chat session with the users, or participants, associated with the one or more user identifier 106, one or more user identifiers 110, user identifier 118, and/or one or more user identifiers 122. In examples, avatars associated with all of the participants of the first message (e.g., users associated with the user identifier 106 and/or the one or more user identifiers 110) and the second message (e.g., users associated with the user identifier 118 and/or the one or more user identifiers 122) are displayed as avatars 128 or grouped into the other indication 130.

Alternatively, or in addition, avatars associated with participants determined to be important or needed in the conversation or potential instant messaging chat session may be displayed as avatars 128 and other users or participants determined not to be necessary in the conversation or instant messaging chat session, may be grouped into the other indication 130. That is, regardless of presence (e.g., regardless of whether a user or participant is currently available as determined by presence information), such avatars associated with each user determined to be important or needed is displayed as an avatar 128. In examples, an importance or needed indication may be derived based on those users listed in a "To:" field vs. the "CC:" field, those users that have contributed to the email thread for example by authoring a message, and/or those users referenced in the message portion of each of the messages comprising the email thread. For example, an avatar associated with a user may be displayed as one of the avatars 128 because the user was listed in the "To:" field, because the user authored a message, and/or because the user was mentioned in the message portion of the email thread. Alternatively, a user that is grouped into the other indication 130 may not have been included in the "To:" field, may not have authored a message, and/or may not have been mentioned in the message portion of the email thread. As previously mentioned, a user may also be included in the other indication 130 based on presence information (e.g., the user is currently not available to participate in the instant messaging chat session as indicated by general presence information and/or a presence indication specific to the instant messaging chat session).

In addition to the "start chat" control 132, the user interface window 102 may also allow a user to reply to an email included in the email thread using the replay feature 134 and/or provide additional functionality, such as an option to view other emails, search for emails, and/or view a calendar. The user interface window 102 may correspond to a user interface for a mobile device; alternatively, or in addition, the user interface window 102 may correspond to a user interface for an email application displaying a window at any computing device.

Figure 2:
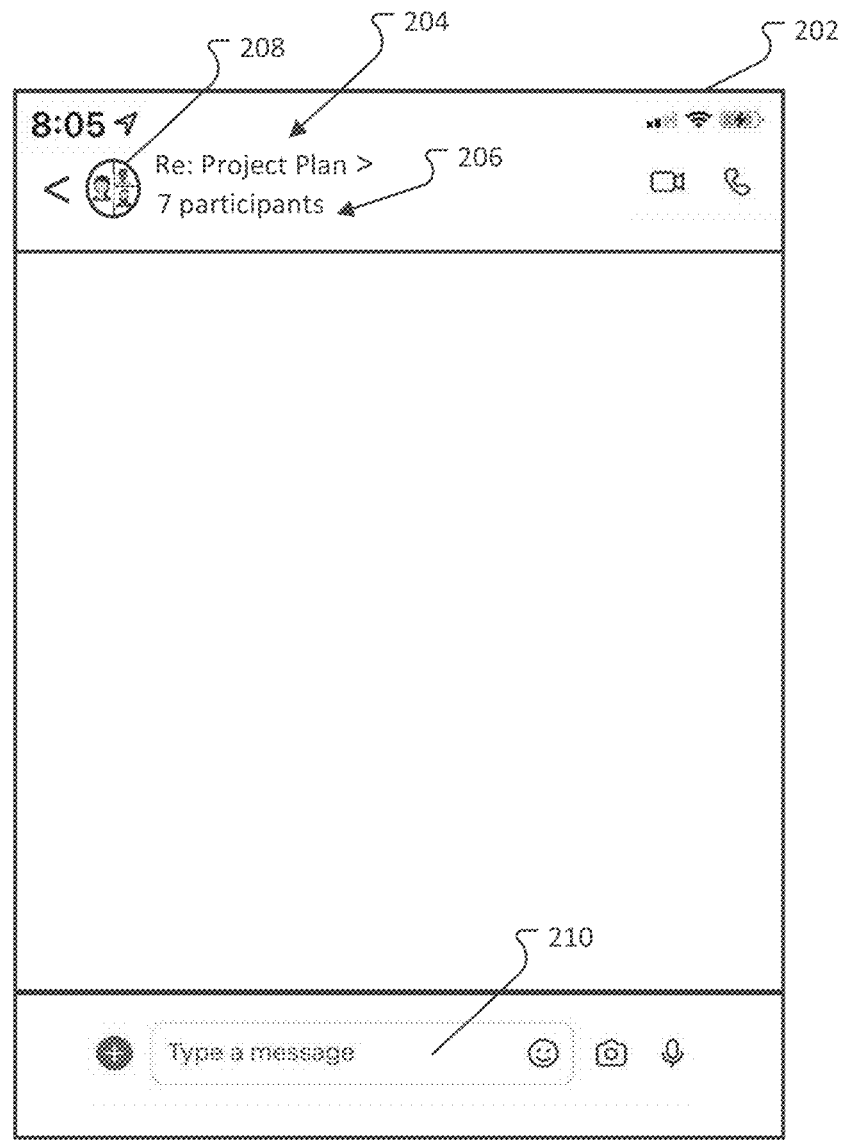
FIG. 2 depicts details of a user interface window in accordance with examples of the present disclosure.

FIG. 2 depicts details of a user interface window 202 in accordance with examples of the present disclosure. Upon selection of the "start chat" control 132 (FIG. 1), the user interface window 202 may be displayed. The user interface window 202 may correspond to a window for an instant messaging chat session, whereby a user initiating the instant messaging chat session via the selection of the "start chat" control 132 (FIG. 1) may compose a message in the field 210 and send the message to users or participants as indicated by the participant indication 206. The participant indication 206 may correspond to the users or participants associated with the displayed avatars 128 (FIG. 1) and/or the displayed avatars 128 (FIG. 1) and the other indication 130 (FIG. 1). For example, the participant indication 206 includes seven participants indicating that all users or participants associated with email thread associated with the user interface window 102 (FIG. 1) may be included in the instant messaging chat session. Upon a hover or click, all participants in the participant indication 206 may be displayed or shown and a user may be presented with the option to remove and/or add users or participants. In examples, a group avatar 208 comprised of avatars associated with the users or participants in the participant indication 206 may be generated. In addition, the instant messaging chat session may include a label or name 204; in examples, the instant messaging chat session name corresponds to or otherwise is based on the email subject 114 (FIG. 1). A user may compose a message in the field 210 and choose to send the message to the participants. Upon sending the message, a user interface window similar to the user interface window 202 may be displayed at a display associated with one or more users or participants.

The instant messaging chat session enabled by the user interface window 202 may correspond to an instant messaging session or allow for collaboration via instant messaging such that message sent via the user interface window 202 can be received by devices associated with the one or more participants as indicated by the participant indication 206 in real-time or near real-time. Unlike email, instant messaging tends to elicit a response much faster, and participants are generally more willing to reply immediately. Further, instant messaging, or chat, tends to be brief and to the point such that instant messaging follows a stream of consciousness type of format, tending to be more informal and casual. Thus, an instant messaging chat session may be more ideal for instantaneous and/or real-time types of collaboration.

Figure 3A:
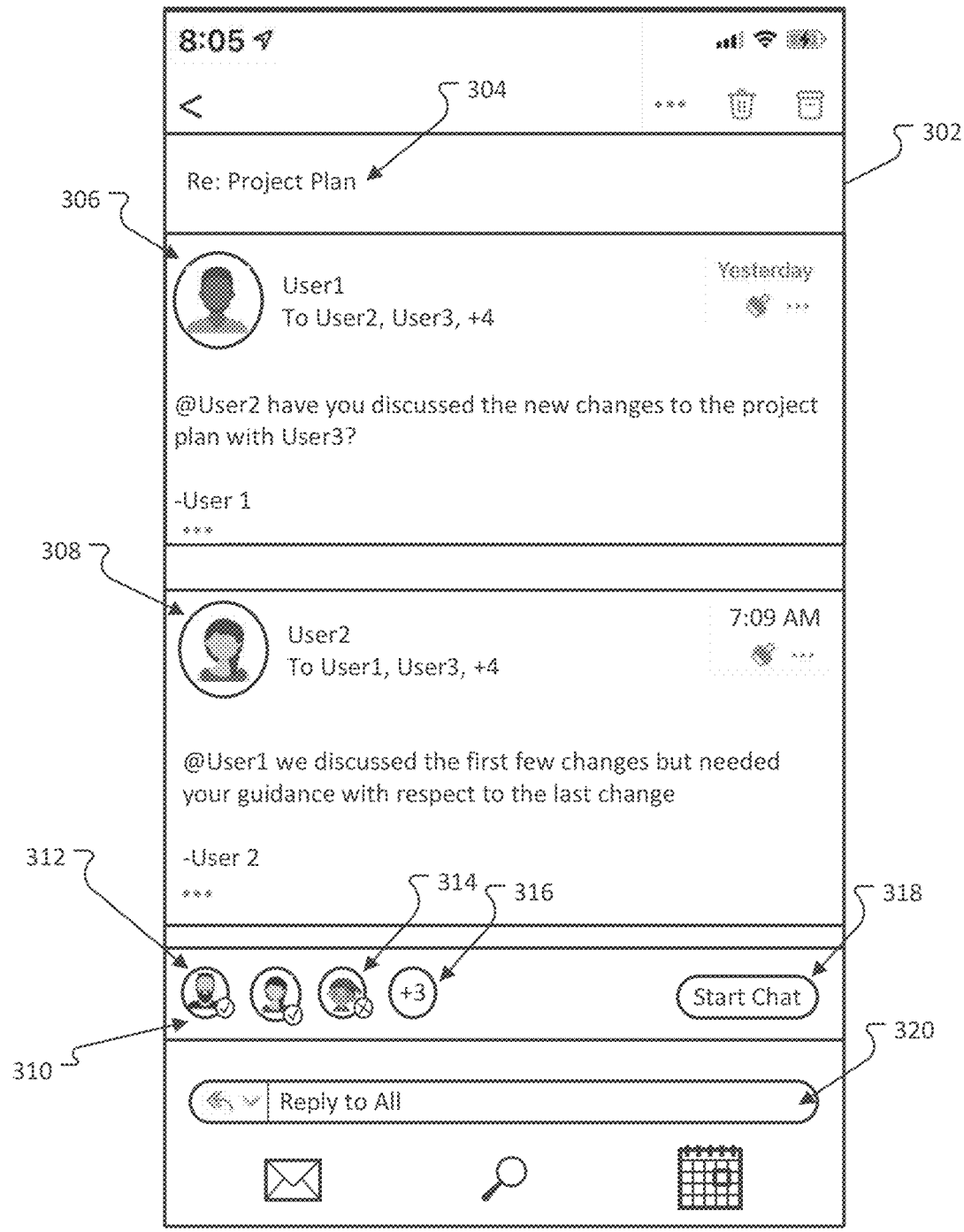
FIG. 3A depicts additional details of a first user interface window in accordance with examples of the present disclosure.

FIG. 3A depicts additional details of a user interface window 302 in accordance with examples of the present disclosure. More specifically, the user interface window 302 is the same as or similar to the user interface window 102 as previously described. For example, the user interface window 302 may include a first message composed by a first user 306, a second message composed by a second user 308, and may include a subject 304. Further, the user interface window 302 may include a window portion 310. The window portion 310 may display one or more avatars 312 corresponding to users or participants determined to be important or needed for a potential instant messaging chat session regardless of whether or not the user or participant associated with the avatar is available as determined by presence information. For example, an avatar 314 may indicate that a user associated with the avatar 314 is not available for an instant messaging chat session (e.g., as indicated by the "X" in the circle). In examples, the presence information may be derived from a presence service responsible for maintaining presence information for each user. For example, the presence information may indicate real-time presence of the user or may be specific to whether or not the user is available in the future to chat (e.g., is available for the next fifteen minutes as indicated on a user's calendar or other source providing user scheduled information).

Alternatively, or in addition, an avatar 314 may indicate that the user associated with the avatar 314 is not available for an instant messaging chat session because of reasons other than presence. That is, a user associated with the avatar 314 may not have the necessary security privileges needed to participate in an instant messaging chat session and/or may not have a chat application installed or configured to communicate with the other participants involved in the email thread. As another example, a user may be unable to chat with the other participants in the group because the user is not available in the future, is not part of the security group, project group, or other group having the same or similar relationship with the other users or participants in the email thread. As another example, the user may be unable to chat with the other participants because the user identifier associated with the user was included in the "CC:" field instead of the "To:" field.

A user may select the "start chat" control 318 and a user interface window similar to the user interface window 202 (FIG. 2) may be displayed. The user interface window may correspond to a window for an instant messaging chat session, whereby a user initiating the instant messaging chat session via the selection of the "start chat" control 318 may compose a message in the field and send the message to one or more users or participants as previously described, for example to the one or more users or participants associated with the one or more avatars in the window portion 310.

Figure 3B:
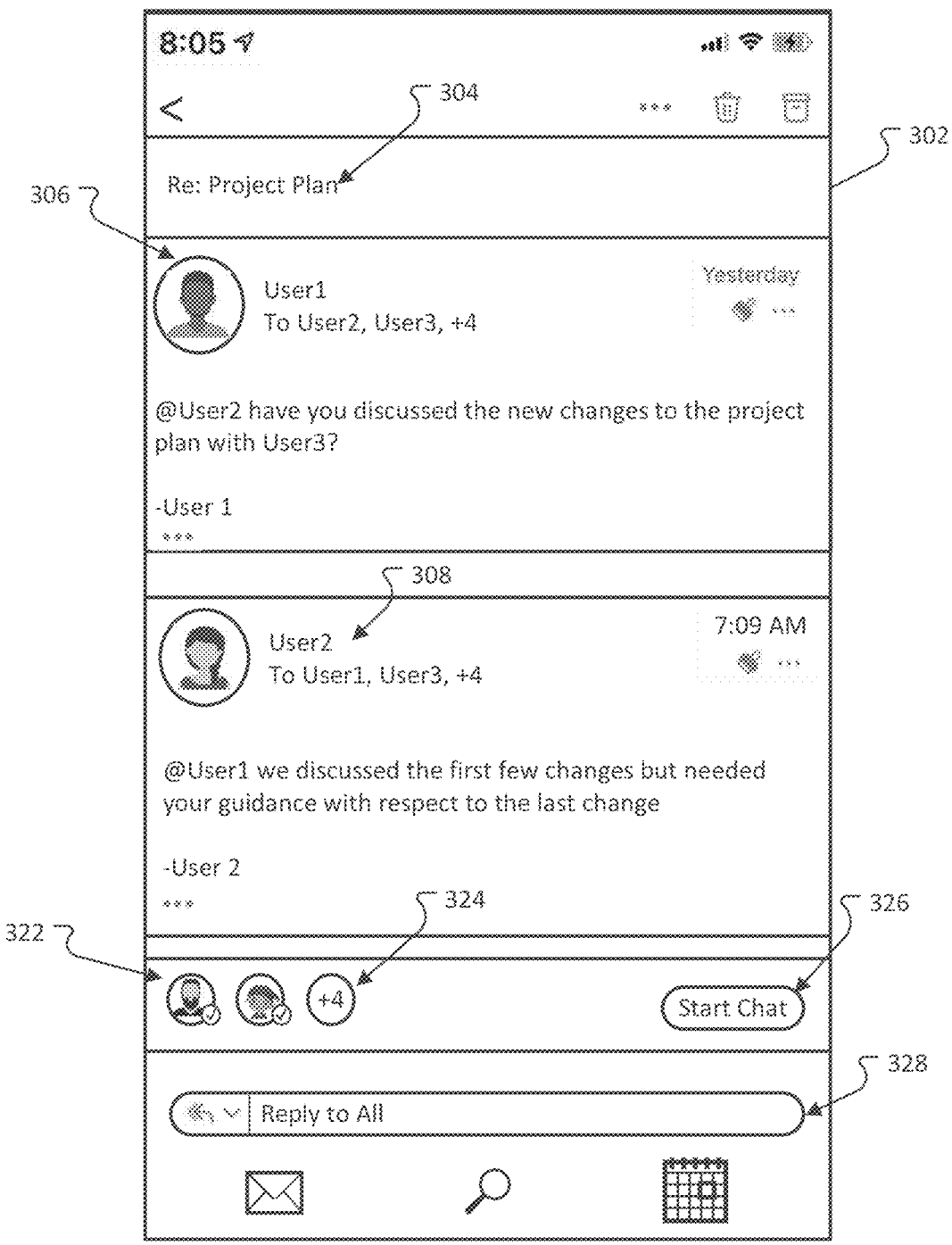
FIG. 3B depicts additional details of a second user interface window in accordance with examples of the present disclosure.

FIG. 3B depicts additional details of a user interface window 302 in accordance with examples of the present disclosure. More specifically, the user interface window 302 is the same as or similar to the user interface window 102 as previously described. For example, the user interface window 302 may include a first message composed by a first user 306, a second message composed by a second user 308, and may include a subject 304. Further, the user interface window 302 may include a window portion 322. The window portion 322 may display one or more avatars corresponding to users or participants that are available for an instant messaging chat session and include those users or participants that are unavailable for an instant messaging chat session in the other indication 324. That is, the avatars displayed in the window portion 322 may be sorted according to availability or presence. The presence information may indicate real-time presence of the user or may be specific to whether or not the user has future availability to chat (e.g., is available for the next fifteen minutes as indicated on a user's calendar). In examples, if one or more users or participants determined to be needed or otherwise important for an instant messaging chat session are not available to chat, the "start chat" control 326 may disappear, fade, or otherwise be inactive. Accordingly, a user may respond to the latest message using the reply field 328 to compose a reply email.

In some examples, if one or more users or participants determined to be needed or otherwise important for an instant messaging chat session become available to chat, the "start chat" control 326 may appear, fade in, or otherwise be rendered active. Accordingly, a user may select the "start chat" control 326 to and a user interface window similar to the user interface window 202 (FIG. 2) may be displayed. The user interface window may correspond to a window for an instant messaging chat session, whereby a user initiating the instant messaging chat session via the selection of the "start chat" control 326 may compose a message in the field and send the message to one or more users or participants as previously described; for example the message may be sent to the one or more users or participants associated with the one or more avatars in the window portion 322.

In examples, the "start chat" control 326 may be available or otherwise displayed based on contextual information associated with the email thread. The contextual information associated with the email thread may be classified into one or more signals and/or behaviors. For example, a direct signal may refer to contextual information associated with the email thread that includes but is not limited to the number of participants in the email thread and/or whether all of the participants are in the same group, such as project group, organizational unit, or otherwise. As another example, an indirect signal may refer to contextual information associated with the email thread that indicates whether the current user, or one or more users, are available for an instant messaging chat session, either in real-time or in the future. That is, presence information of one or more users may be utilized as an indirect signal that may be used in the determination as to whether or not the "start chat" control 326 is available. As another example, a behavior signal may refer to contextual information associated with the email thread that indicates how participants are interacting with one another and/or the email thread. For example, if participants are frequently replying in the email thread such that the email thread resembles more of a chat than a synchronous email thread, then the "start chat" control 326 may be presented to one or more users as a suggestion to take the "chat" offline or otherwise to a communication session other than email. In examples, the participants to be included in the instant messaging chat session may include all of the participants in the email thread or may be limited to users that are frequently replying.

Figure 4:
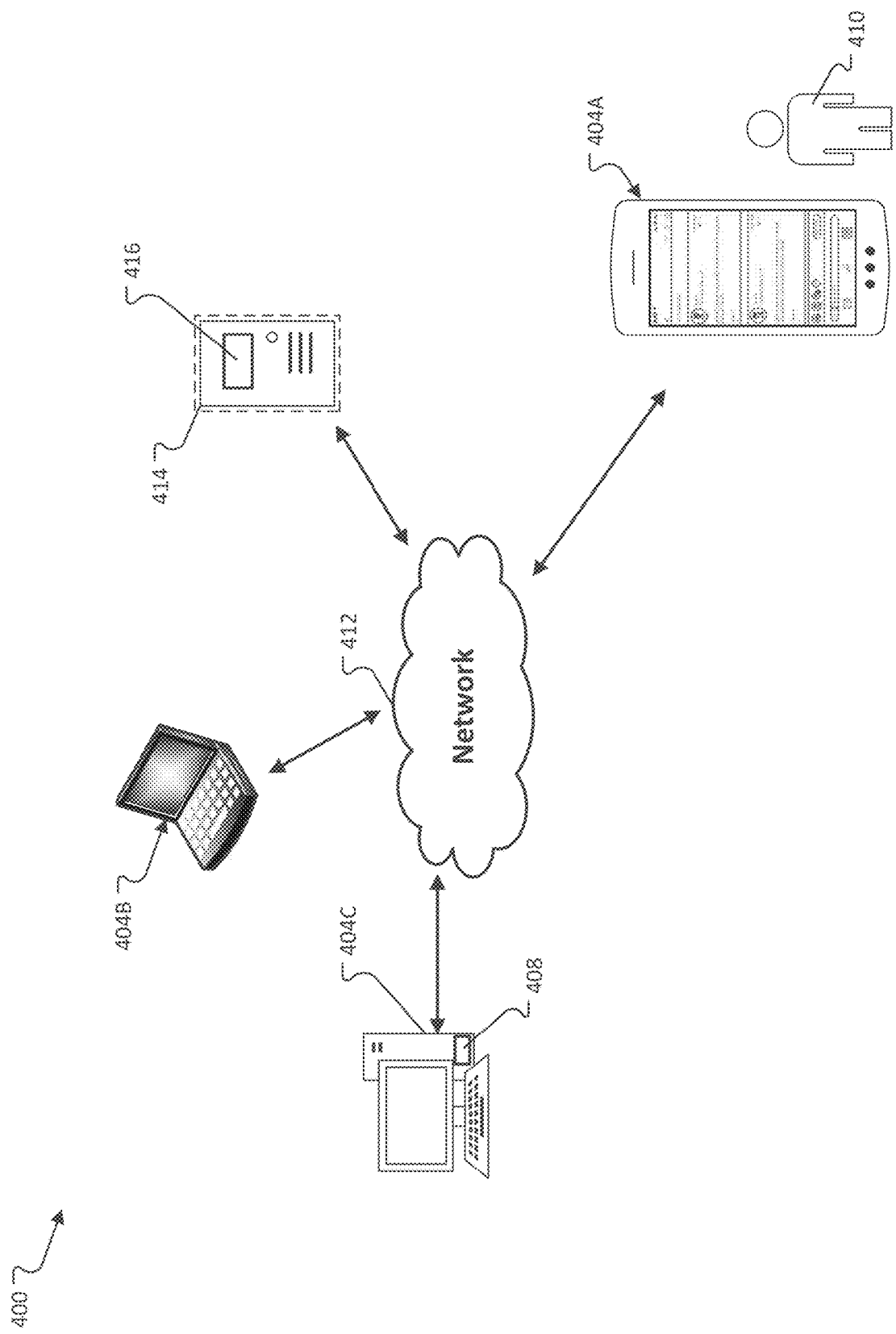
FIG. 4 depicts an example communication system for transitioning an email thread into a chat session in accordance with examples of the present disclosure.

FIG. 4 depicts an example communication system 400 for transitioning an email thread into an instant messaging chat session in accordance with examples of the present disclosure. In examples, the communication system 400 may include one or more computing devices 404A-C, where the computing device 404A may correspond to mobile device such as but not limited to a smartphone or table, the computing device 404B may correspond to a laptop, and the computing device 404C may correspond to a desktop. In examples, each of the computing devices 404A-C may include an application 408, where the application 408 may correspond to one or more of an email application and/or a chat application. In examples, the application 408 may correspond to a web browser accessing email and/or accessing a chat functionality. Accordingly, a user 410 may view an email thread on the computing device 404A for example using an email application 408.

The computing device 404 may be in communication with one or more servers 414 via the communication network 412; the one or more servers 414 may include an application 416 that provides email and/or chat functionality via the communication network 412. The one or more servers 414 may be located at a single location or may be located remotely from one another. The one or more servers 414 may further provide presence information for a user, such as user 410, via the application 416. As an example, a user recently interacting with a computing device 40 may be determined to be active or otherwise have a presence type of available; that is, the user is available at the computing device 404. Accordingly, the presence information associated with the user (e.g., associated with a user identifier of the user) may indicate the user is available, for example by associating an available type of presence with the user identifier associated with the user. Presence information can be based on a user's schedule, such as a calendar, computing device movement information, and/or may be manually set by a user. Accordingly, a user 410 may view an email or email thread on the computing device 404; the application 416 may provide presence information to the application 408. Accordingly, the application 408 may cause a "start chat" control, such as the "start chat" control 132 (FIG. 1) to be rendered to a display of the computing device 404. In some examples, and as previously described, the application 408 may not render the "start chat" control if it is determined that one or more important or otherwise needed participants is not available to chat. In some examples, the application 416 may cause a "start chat" control, such as the start chat control 132 (FIG. 1) to be rendered to a display of the computing device 404. As previously described, the application 416 may determine that one or more important or otherwise needed participants is not available to chat and therefore prevent the "start chat" control from being rendered to the display of the computing device 404.

Upon a user, such as user 410, sending a chat or instant message from a computing device, such as the computing device 404A, the chat or instant message may be sent to the application 416 at the one or more servers 414. The application 416 may then provide or otherwise transmit the instant message to one or more other computing devices associated with one or more other participants of the instant messaging chat session, such as computing device 404B. Accordingly, the contents of the message are displayed to another user.

Figure 5:
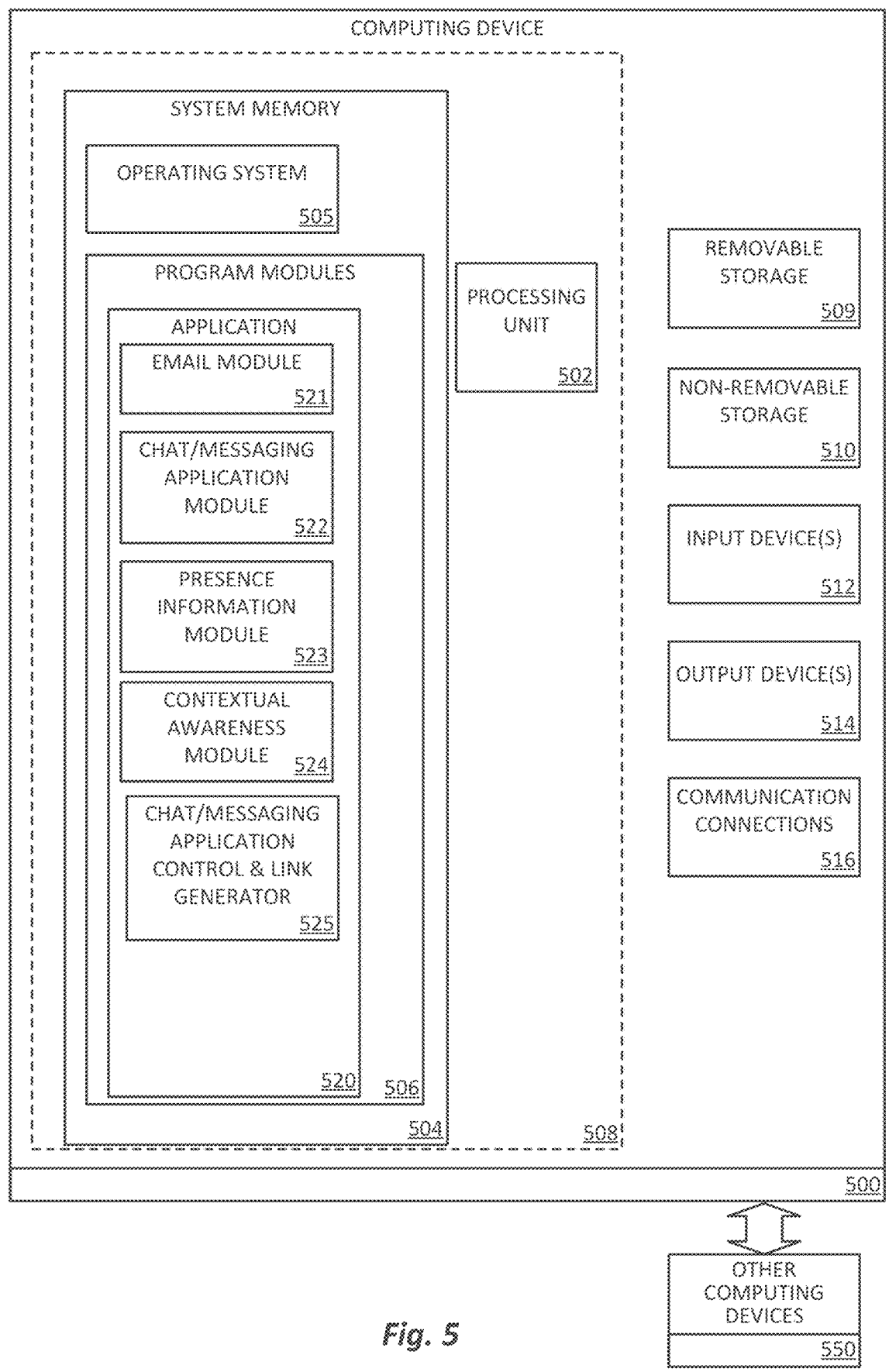
FIG. 5 is a block diagram illustrating physical components (e.g., hardware) of a computing system which aspects of the disclosure may be practiced

FIG. 5 is a block diagram illustrating physical components (e.g., hardware) of a computing system 500 which aspects of the disclosure may be practiced. The computing system components described below may be suitable for the computing and/or processing devices described above. In a basic configuration, the computing system 500 may include at least one processing unit 502 and a system memory 504. Depending on the configuration and type of computing system, the system memory 504 may comprise, but is not limited to, volatile storage (e.g., random-access memory (RAM)), nonvolatile storage (e.g., read-only memory (ROM)), flash memory, or any combination of such memories.

The system memory 504 may include an operating system 505 and one or more program modules 506 suitable for running software application 520, such as one or more components supported by the systems described herein. As examples, system memory 504 may include an email module 521, a chat/messaging application module 522, a presence information module 523, a contextual awareness module 524, and a chat/messaging application link generator 525. In examples, the computing system 500 may be the same as or similar to the computing device 404 (FIG. 4) and/or the server 414 (FIG. 4) as previously described. The email module 521 may be configured to send and receive email, provide a user interface, such as the user interface window 102 (FIG. 1), and generally allow a user to compose an email, read an email, and respond to one or more emails in an email thread. In addition, the email module 521 may maintain emails for one or more users. The chat/messaging application module 522 may be configured to send and receive instant messages, provide a user interface, such as the user interface window 202 (FIG. 2), and generally allow a user to compose a message, read a message, and respond to one or more messages. In addition, the chat/messaging application module 522 may be configured to maintain a history of chat, or instant messages for one or more users and/or one or more instant messaging chat sessions.

The presence information module 523 may be configured to obtain and maintain presence information for one or more users or participants in an email thread. Presence information can be based on a user's schedule, such as a calendar, computing device movement information, and/or may be manually set by a user. In examples, the presence information may further include future availability information based on one or more blocks of time in a calendar. For example, a block of time in a calendar associated with a user may be marked as available or unavailable; such block of time may be used to generate a future availability signal.

The contextual awareness module 524 may receive an email message and/or email thread and generate a signal directed to the "start chat" control based on contextual information associated with the email thread. For example, a direct signal may refer to contextual information associated with the email thread that includes but is not limited to the number of participants in the email thread and/or whether all of the participants are in the same group, such as but not limited to a project group, an organizational unit, or otherwise. As another example, an indirect signal may refer to contextual information associated with the email thread that indicates whether the current user, or one or more users, are available for an instant messaging chat session, either in real-time or in the future. That is, presence information of one or more users may be utilized as an indirect signal that may be used in the determination as to whether or not the "start chat" control is available. As another example, a behavior signal may refer to contextual information associated with the email thread that indicates how participants are interacting with one another and/or the email thread. For example, if participants are frequently replying in the email thread such that the email thread resembles more of a chat than a synchronous email thread, then the contextual awareness module 524 may generate a signal indicating that the "start chat" control should be presented to one or more users as a suggestion to take the "chat" offline or otherwise to a communication session other than email. The contextual awareness module may include a model such that a direct/indirect/behavior signal corresponds to a probability. For example, the model may generate a signal that indicates that based on the contextual analysis of an email and/or an email thread, the model is 60% confident that the "start chat" control should be displayed. The signal may be provided to the chat/messaging application control and link generator 525.

The chat/messaging application control and link generator 525 may receive an indication, such as a signal, from the contextual awareness module 524, and based on the received indication, determine that the "start chat" control, such as the "start chat" control 132 is displayed to a user. Alternatively, or in addition, the chat/messaging application control and link generator 525 may receive an indication, such as a signal, from the contextual awareness module 524, and based on the received indication, determine that the "start chat" control, such as the "start chat" control 132 should not be displayed to a user. Accordingly, the "start chat" control may be grayed out, hidden, or otherwise removed from a user's view.

Furthermore, embodiments of the disclosure may be practiced in conjunction with a graphics library, other operating systems, or any other application program and are not limited to any particular application or system. This basic configuration is illustrated in FIG. 5 by those components within a dashed line 508. The computing system 500 may have additional features or functionality. For example, the computing system 500 may also include additional data storage devices (removable and/or non-removable) such as magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., software applications 520) may perform processes including, but not limited to, the aspects as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit, discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units, and various application functionality, all of which are integrated (or "burned") onto the chip substrate as a single integrated circuit. When operating via a SOC, the functionality described herein, with respect to the capability of the client to switch protocols, may be operated via application-specific logic integrated with other components of the computing system 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 500 may also have one or more input device(s) 512 such as a keyboard, a mouse, a pen, a sound or voice input device, a touch or swipe input device, etc. The output device(s) 514, such as a display, speakers, a printer, etc., may also be included. The aforementioned devices are examples, and others may be used. The computing system 500 may include one or more communication connections 516, allowing communications with other computing systems 550. Examples of suitable communication connections 516 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable, and non-removable media implemented in any method or technology for storage of information, such as computer-readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage, or other magnetic storage devices, or any other article of manufacture which can be used to store information, and which can be accessed by the computing system 500. Any such computer storage media may be part of the computing system 500. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
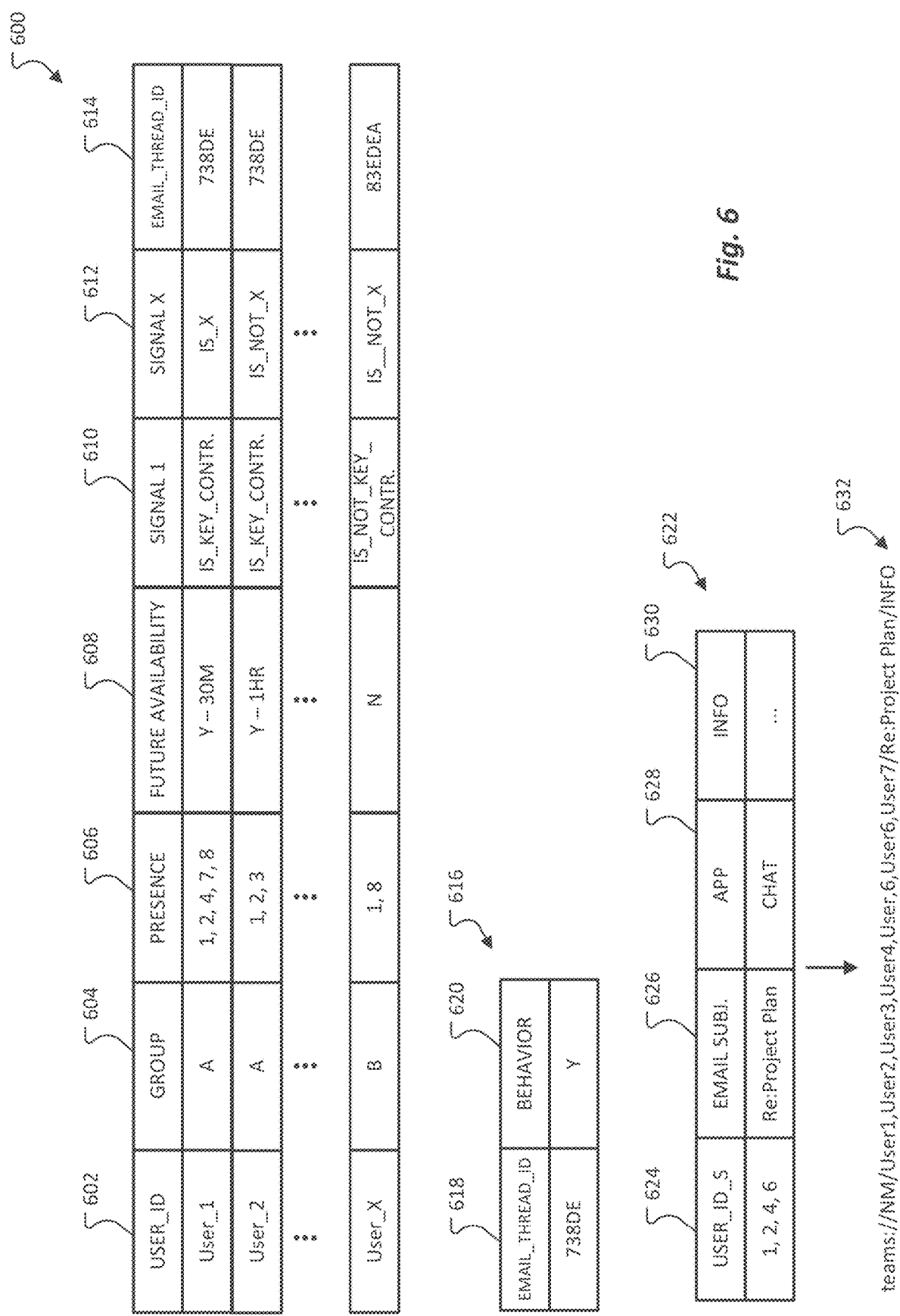
FIG. 6 depicts details of data structures in accordance with examples of the present disclosure.

FIG. 6 depicts details of data structures 600, 616, and 622 in accordance with examples of the present disclosure. The data structures 600, 616, and 622 may reside at a server, such as the server 414 (FIG. 4) and may be maintained by the application 416 (FIG. 4) and/or the application 408 (FIG. 4). In examples, the data structure 600 includes a plurality of information fields associated with one or more users or participants. The one or more information fields may include a user identifier 602, group 604 information, presence information, future presence, or availability information 608, one or more signals 610, 612, and an email identifier 614. The user identifier 602 is associated with a specific user or participant; the group 604 identifies a grouping to which the user associated with the user identifier 602 belongs. The group may be derived from a domain portion of a user's email address and/or may be determined based on the user identifier 602. The presence field 606 may include one or more presence types. For example, the presence field 606 may indicate the user is available, away, not-online, busy, in a call, etc. The data structure 600 may further include a future availability field 608 indicating the future availability of the user associated with the user identifier. In addition, one or more signals 610/612 associated with the user may be determined and stored in the data structure 600. The one or more signals 610/612 may indicate one or more characteristics that are present and associated with a user in an email thread having an email thread identifier 613. For example, the user associated with the user identifier 602 may be a key contributor to the email thread as indicated by the signal 610, and/or is an important participant or is not an important participant as indicated by the signal 612. Of course, additional signals may be included in the data structure 600. The data structure 600 may include an identifier 614 uniquely identifying the email thread. Moreover, the data structure 600 may include more or less fields than shown in FIG. 6; further, the fields of the data structure 600 may be distributed across multiple data structures and need not be limited to a single data structure or location.

The data structure 616 may associate one or more behaviors with the email thread based on the email thread identifier 618. For example, a first behavior 620 may be associated with the content of the email thread, such as the text in the body of the last email message. In examples, an analysis of such content, and/or other content of the email thread, may indicate that the users or participants in the email thread may benefit from an instant messaging chat session or instant message collaboration session. Such an analysis may be performed by the application 416 (FIG. 4), 408 (FIG. 4), the contextual awareness module 524 (FIG. 5), and/or the chat/messaging application link generator 525 (FIG. 5). Accordingly, the behavior field 620 may indicate a result of such analysis; for example, a Y may indicate that a behavior indicates the users or participants would benefit from an instant messaging chat session. Of course, other behaviors and behavior fields may be included in the data structure 616.

Based on the data structures 600 and 616, a data structure 622 may be generated or otherwise populated, where the data structure 622 may include information for generating a deep link 632 used to generate an instant message or instant messaging chat session. In examples, the data structure 622 may include the users or participants to be included in the instant messaging chat session, the email subject 626, a designated application 628 for initiating the instant messaging chat session, and/or other information 630 that may be needed to generate a deep link, such as the deep link 632. The deep link 632, once generated, may be processed by an operating system of a computing device for example, thereby causing a user interface window, such as the user interface window 202 (FIG. 2), to be displayed at a display of a computing device, such as a computing device 404 (FIG. 4).

Figure 7:
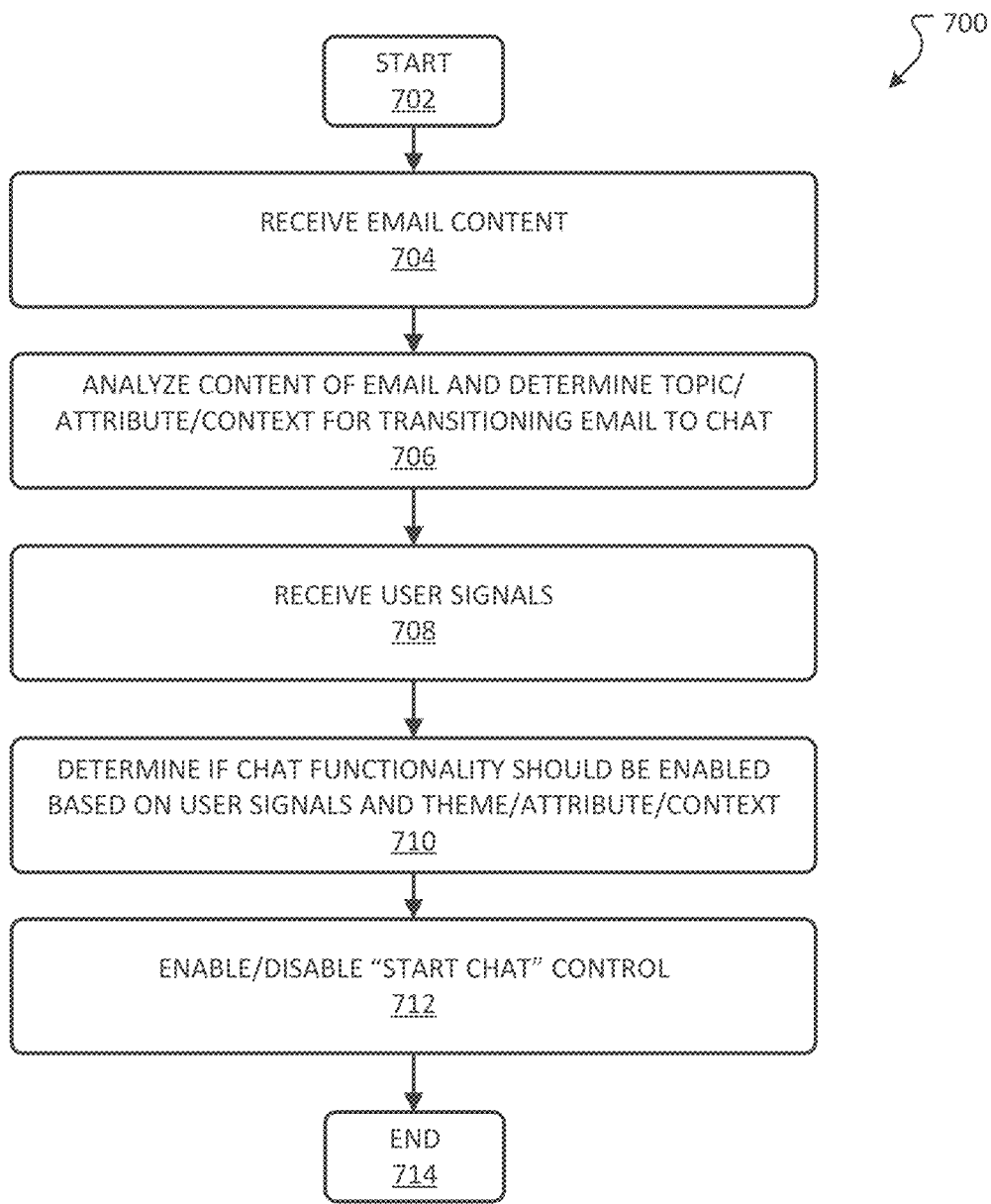
FIG. 7 depicts details of a method for providing contextual information associated with an email thread to a user and for displaying a "start chat" control in accordance with examples of the present disclosure.

FIG. 7 depicts details of a method 700 for providing contextual information associated with an email thread to a user and for displaying a "start chat" control in accordance with examples of the present disclosure. A general order for the steps of the method 700 is shown in FIG. 7. Generally, the method 700 starts at 702 and ends at 714. The method 700 may include more or fewer steps or may arrange the order of the steps differently than those shown in FIG. 7. The method 700 can be executed as a set of computer-executable instructions executed by a computer system and encoded or stored on a computer readable medium. In examples, aspects of the method 700 are performed by one or more processing devices, such as a computer or server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method starts at 702, where flow may proceed to 704. At 704, email content is received. In examples, the email content is part of a single email message; alternatively, or in addition, the email content may be part of an email thread. The email content is then analyzed at 706 to determine if a topic of the email content and/or other attributes of the email content support transitioning to an instant messaging chat session. For example, a topic of the email content may indicate that the email discussions could be moved to an instant messaging chat session. As another example, an attribute of the email content may indicate that contents of the email are of a sensitive nature and therefore should not be discussed in an instant messaging chat session. As another example, contextual information of the email content may indicate that participants are replying to emails with high frequency and therefore the conversation occurring over email would be better suited in an instant messaging chat session.

In some examples, step 706 may be optional such that a determination to surface a "start chat" control may depend on information association derived or otherwise provided by a user. For example, at step 708, one or more user signals may be received. In examples, the one or more user signals may correspond to presence information for one or more users. In some examples, the presence information may be for a subset of all users or participants. For example, the presence information for users associated with user identifier appearing in the "To:" field may be received at 708. In other examples, presence information from all users is received at 708. The method may proceed to 710 where a determination is made regarding the "start chat" control. For example, if user presence information and/or contextual information associated with the email content are favorable for enabling an instant messaging chat session, then the "start chat" control may be surfaced, enabled, or otherwise displayed at a user interface window at step 712. As another example, if presence information indicates that an important user is not available to chat, then the "start chat" control functionality may be disabled, grayed out, or otherwise not displayed in a user interface window at step 712. The method 700 may then end at step 714.

Figure 8:
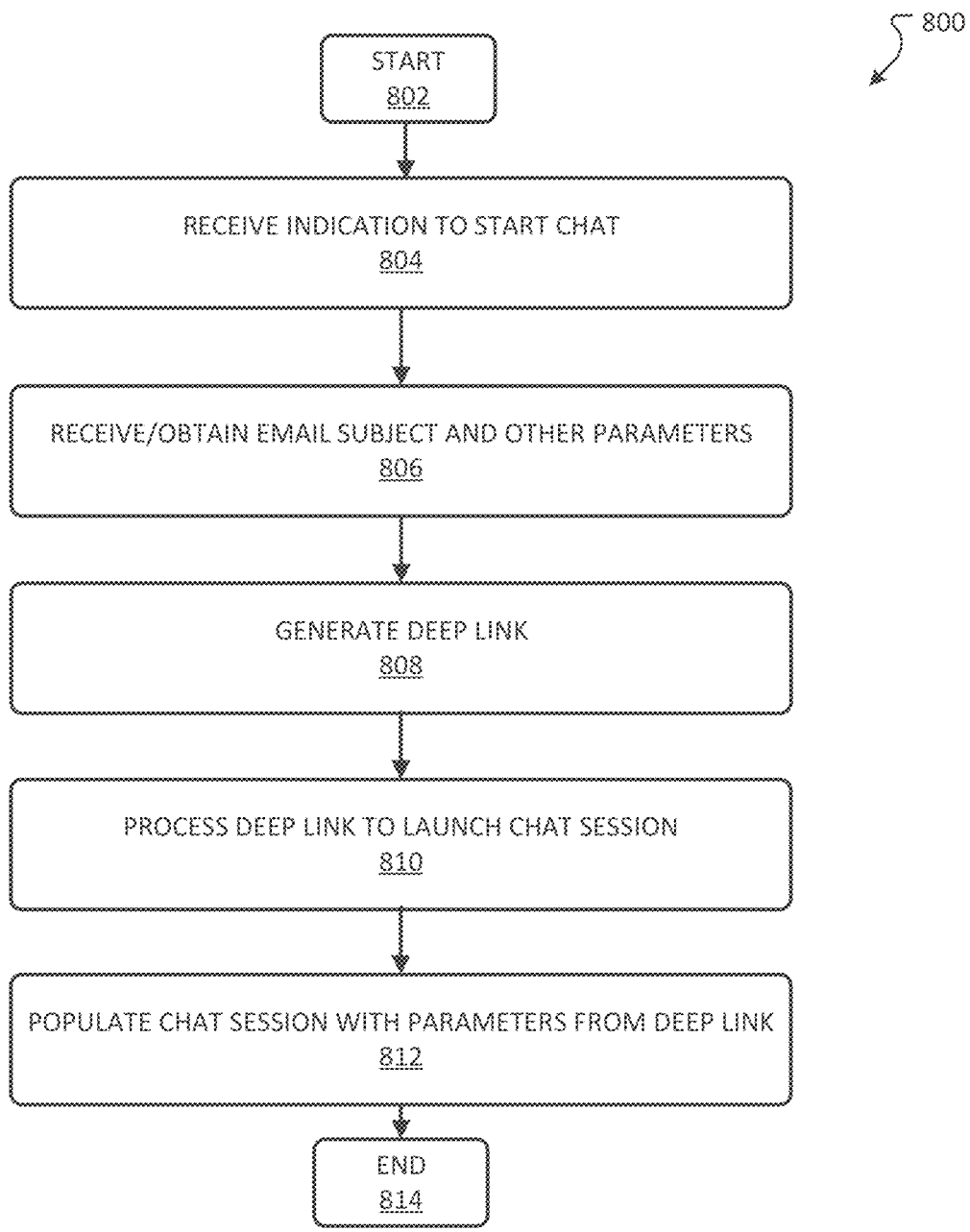
FIG. 8 depicts details of a method for initiating a chat session from an email in accordance with examples of the present disclosure.

FIG. 8 depicts details of a method 800 for initiating an instant messaging chat session from an email in accordance with examples of the present disclosure. A general order for the steps of the method 800 is shown in FIG. 8. Generally, the method 800 starts at 802 and ends at 814. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer or server. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method starts at 802, where flow may proceed to 804. At 804, an indication corresponding to a user request to start an instant messaging chat session is received. In examples, the indication may be received when a user selects a "start chat" control. Once the indication to start an instant messaging chat session is received, the method 800 may proceed to 806, where information and parameters for starting the instant messaging chat session may be obtained. In examples, a subject of the email thread and the user identifiers and/or participants may be obtained. The method 800 may proceed to 808, where a deep link is generated. The deep link may include the email subject and one or more parameters obtained at step 806.

Once the deep link is generated, the deep link may be passed to an application configured to initiate an instant messaging chat session. In examples, the operating system and/or or application configured to initiate the instant messaging chat session may process the deep link at 810, extract one or more parameters, and generate a user interface window. The user interface window may then be populated with the one or more parameters obtained from the deep link. For example, the instant messaging chat session may include a name or other identifier that is based on or equal to the email subject. In examples, user identifiers associated with the participants in the instant messaging chat session may then be populated into an addressable field within the user interface window of the instant messaging chat session. In some examples, a first instant message is sent to the participants; alternatively, no message is sent until the user initiating the instant messaging chat session indicates that a first message should be sent (e.g., writes out a message and/or selects a control to send chat message to a plurality of users). The method 800 may end at 814.

Figure 9A:
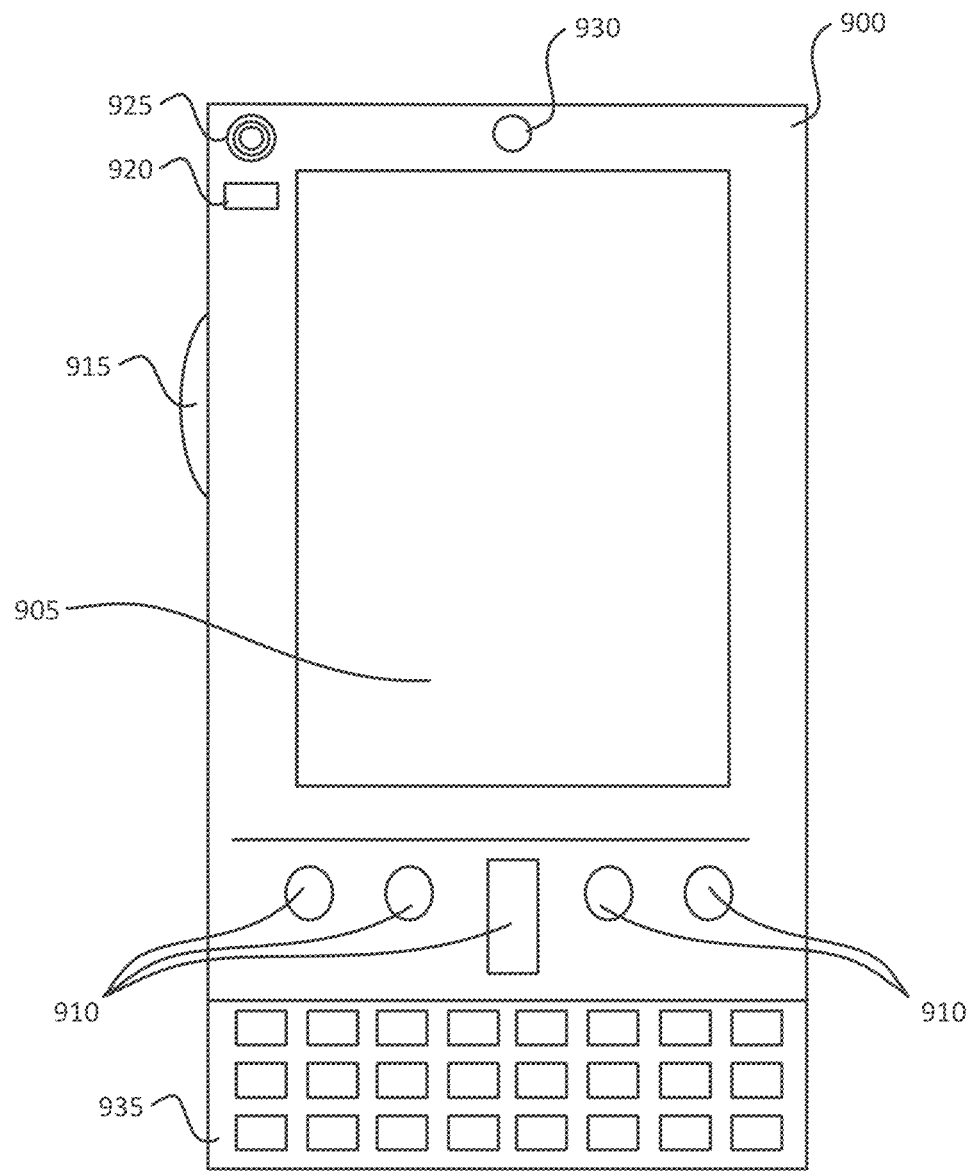
FIGS. 9A-9B depict details of one or more computing systems in accordance with examples of the present disclosure.
Figure 9B:
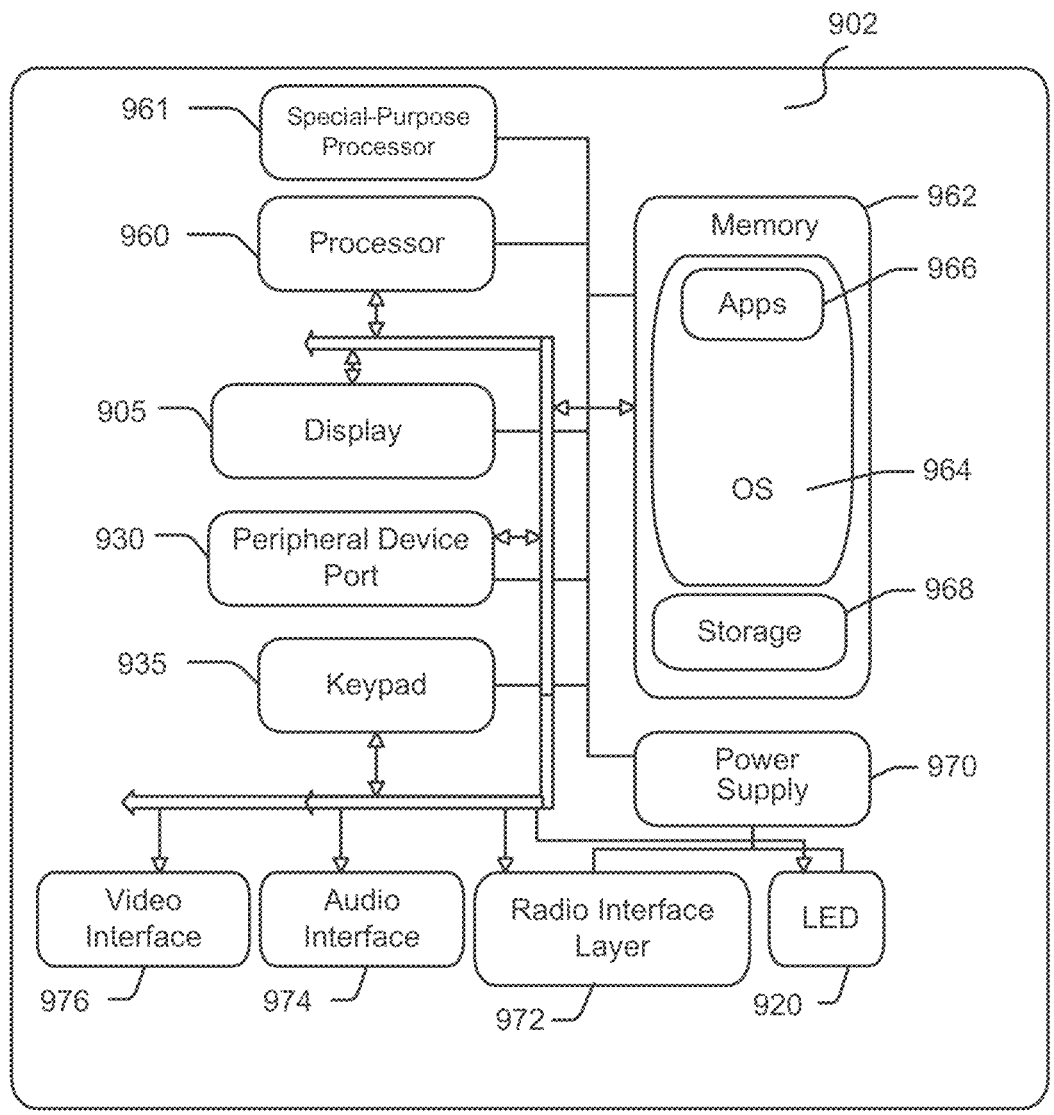

FIGS. 9A-9B illustrate a computing system 900, for example, a mobile telephone, a smart phone, wearable computer (such as a smart watch), a tablet computer, a desktop computer, a laptop computer, and the like, with which embodiments of the disclosure may be practiced. With reference to FIG. 9A, one aspect of a computing system 900 for implementing the aspects is illustrated. In a basic configuration, the computing system 900 is a desktop computer having both input elements and output elements. The computing system 900 typically includes a display 905, which may also function as an input device (e.g., a touch screen display). The computing system 900 may also include a keypad 935. The keypad 935 may be a physical keypad or a "soft" keypad generated on the touch screen display.

In various embodiments, the output elements include the display 905 for showing a graphical user interface (GUI), a visual indicator 920 (e.g., a light-emitting diode), and/or an audio transducer 925 (e.g., a speaker). In yet another aspect, the computing system 900 incorporates input and/or output ports, such as an audio input (e.g., a microphone jack), an audio output (e.g., a headphone jack), and a video output (e.g., an HDMI port) for sending signals to or receiving signals from an external device.

FIG. 9B is a block diagram illustrating the architecture of one aspect of a mobile computing system. That is, the computing system 900 can incorporate a system (e.g., an architecture) 902 to implement some aspects. In one embodiment, system 902 is implemented as a "computing system" capable of running one or more applications (e.g., browser, e-mail, calendaring, contact managers, messaging clients, games, and media clients/players). In some aspects, system 902 is integrated as a computing system, such as a desktop computer.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, maps programs, and so forth. System 902 also includes a nonvolatile storage area 968 within the memory 962. The nonvolatile storage area 968 may be used to store persistent information that should not be lost if the system 902 is powered down. The application programs 966 may use and store information in the nonvolatile storage area 968, such as e-mail or other messages used by an e-mail application, and the like. A synchronization application (not shown) also resides on system 902 and is programmed to interact with a corresponding synchronization application resident on a host computer to keep the information stored in the nonvolatile storage area 968 synchronized with corresponding information stored at the host computer. As should be appreciated, other applications may be loaded into the memory 962 and run on the computing system 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world" via a communications carrier or service provider. Transmissions to and from the radio interface layer 972 are conducted under the control of the operating system 964. In other words, communications received by the radio interface layer 972 may be disseminated to the application programs 966 via the operating system 964, and vice versa.

The system 902 may further include a video interface 976 that enables an operation of an on-board camera 930 to record still images, video stream, and the like. A computing system 900 implementing the system 902 may have additional features or functionality. For example, the computing system 900 may also include additional data storage devices (removable and/or non-removable) such as magnetic disks, optical disks, or tape. Such additional storage is illustrated in FIG. 9B by the nonvolatile storage area 968.

Data/information generated or captured by the computing system 900 and stored via the system 902 may be stored locally on the computing system 900, as described above, or the data may be stored on any number of storage media that may be accessed by the device via the radio interface layer 972 or via a wired connection between the computing system 900 and a separate computing system associated with the computing system 900, for example, a server computer in a distributed computing network, such as the Internet. As should be appreciated, such data/information may be accessed via the computing system 900 via the radio interface layer 972 or via a distributed computing network. Similarly, such data/information may be readily transferred between computing systems for storage and use according to well-known data/information transfer and storage means, including electronic mail and collaborative data/information sharing systems.

Figure 10:
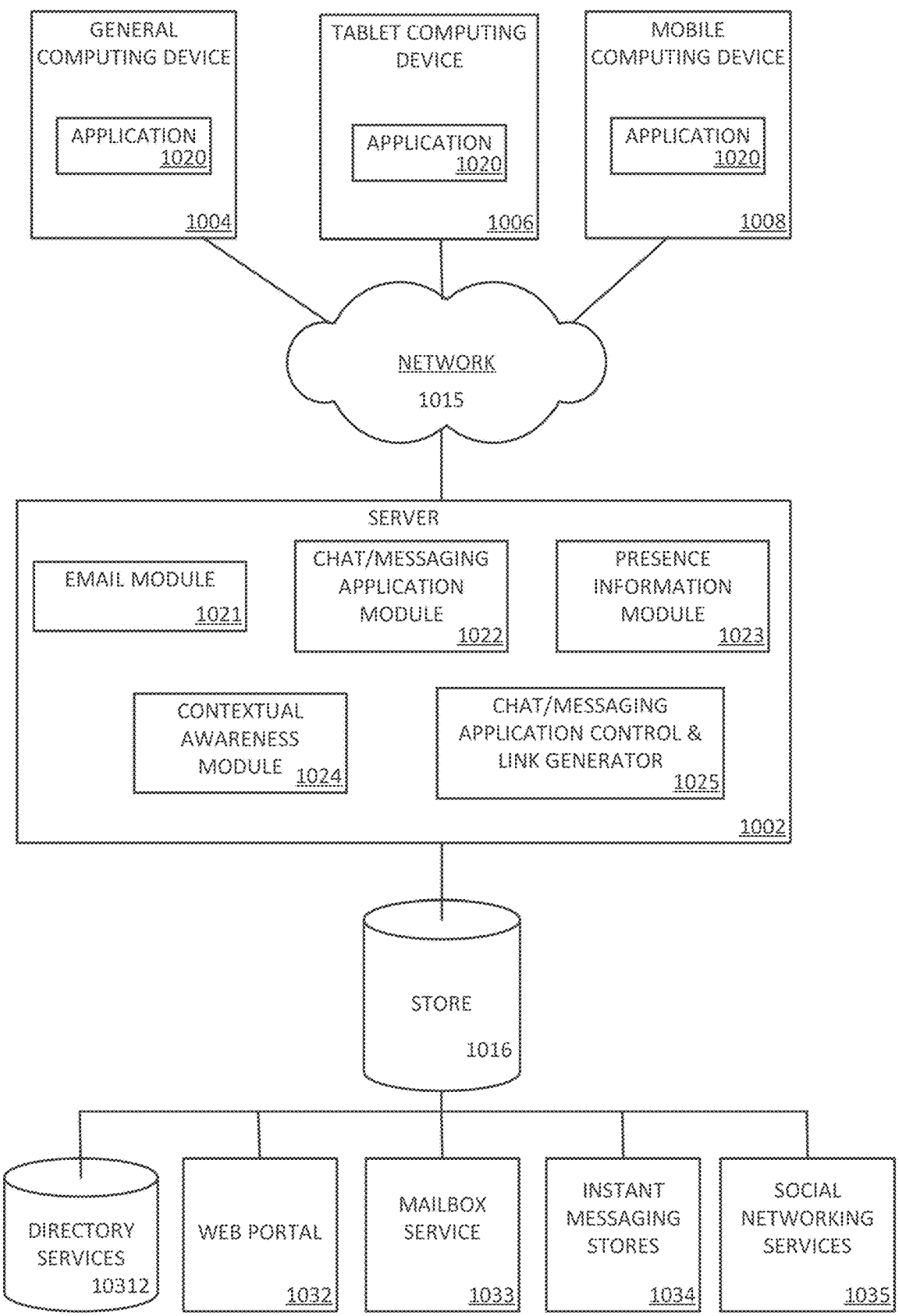
FIG. 10 depicts an architecture of a system for processing data received at a computing system in accordance with examples of the present disclosure.

FIG. 10 illustrates one aspect of the architecture of a system for processing data received at a computing system from a remote source, such as a personal computer 1004, a tablet computing device 1006, or mobile computing device 1008, as described above. Content at a server device 1002 may be stored in different communication channels or other storage types. For example, various files may be stored using a directory service 1031, a web portal 1032, a mailbox service 1033, an instant messaging store 1034, or social networking services 1035.

One or more of the previously described program modules 506 (FIG. 5) or software applications 520 (FIG. 5) may be employed by server device 1002 and/or the personal computer 1004, a tablet computing device 1006, or mobile computing device 1008, as described above. For example, the server device 1002 may include an email module 1021, a chat/messaging application module 1022, a presence information module 1023, a contextual awareness module 1024, and a chat/messaging application link generator 1025. The email module 1021 may be the same as or similar to the email module 521 (FIG. 5); the chat/messaging application module 1022 may be the same as or similar to the chat/messaging application module 522 (FIG. 5); the presence information module 1023 may be the same as or similar to the presence information module 523 (FIG. 5); the contextual awareness module 1024 may be the same as or similar to the contextual awareness module 524 (FIG. 5); the chat/messaging application link generator 1025 may be the same as or similar to the chat/messaging application link generator 525 (FIG. 5).

The server device 1002 may provide data to and from a client computing device such as a personal computer 1004, a tablet computing device 1006, and/or a mobile computing device 1008 (e.g., a smart phone) through a network 1015. By way of example, the computer system described above may be embodied in a personal computer 1004, a tablet computing device 1006, and/or a mobile computing device 1008 (e.g., a smart phone). The personal computer 1004, tablet computing device 1006, and/or the mobile computing device 1008 may be the same as or similar to any one of the computing devices 404 (FIG. 4). Any of these embodiments of the computing devices may obtain content from the store 1016, in addition to receiving graphical data useable to be either pre-processed at a graphic-originating system or post-processed at a receiving computing system.

In addition, the aspects and functionalities described herein may operate over distributed systems (e.g., cloud-based computing systems), where application functionality, memory, data storage, and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced includes keystroke entry, touch screen entry, voice or other audio entry, gesture entry where an associated computing device is equipped with detection (e.g., the camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of order, as shown in any flowchart. For example, two blocks shown in succession may, in fact, be executed substantially concurrently, or the blocks may sometimes be executed in the reverse order, depending upon the functionality/acts involved.

In accordance with at least one aspect of the present disclosure, a method for initiating an instant messaging chat session from an email thread including at least one email is described. The method may include receiving an email thread including at least one email; extracting a plurality of user identifiers from the at least one email; obtaining presence information associated with each user identifier of the plurality of user identifiers; ordering the plurality of user identifiers based on the presence information associated with each user identifier of the plurality of user identifiers; causing display of the ordered plurality of user identifiers together with an indication of the presence information associated with each user identifier; evaluating criteria to determine whether to display a user control associated with an instant messaging capability, wherein the criteria includes the presence information associated with at least one user identifier of the plurality of user identifiers; and in response to a selection of the user control, initiating a session of an instant messaging application with at least one user associated with the at least one user identifier.

In accordance with at least one aspect of the above method, the method includes causing the user control to be disabled based on the presence information associated with at least one user identifier of the plurality of user identifiers. In accordance with at least one aspect of the above method, the criteria includes at least one of a an email reply frequency, a number of user identifiers associated with the email thread, or a topic derived from contents of the at least one email. In accordance with at least one aspect of the above method, the presence information associated with at least one user identifier of the plurality of user identifiers is for user identifiers obtained from a "To:" field of the at least one email message. In accordance with at least one aspect of the above method, the method includes extracting a plurality of parameters from the email thread in response to a selection of the user control; generating a deep link including the extracted plurality of parameters; and initiating the session of the instant messaging application based on the extracted plurality of parameters included in the deep link. In accordance with at least one aspect of the above method, the extracted plurality of parameters includes a subject extracted from the at least one email, and the session of the instant messaging application associates the subject with a session group name. In accordance with at least one aspect of the above method, the presence information is displayed such that user identifiers associated with an available type of presence are displayed before user identifiers associated with an unavailable type of presence.

In accordance with at least one aspect of the present disclosure, a system for initiating an instant messaging chat session from an email thread including at least one email is described. The system may include a processor; and memory including instructions which when executed by the processor, cause the processor to: receive an email thread including at least one email; extract a plurality of user identifiers from the at least one email; obtain presence information associated with each user identifier of the plurality of user identifiers; order the plurality of user identifiers based on the presence information associated with each user identifier of the plurality of user identifiers; cause display of the ordered plurality of user identifiers together with an indication of the presence information associated with each user identifier; evaluate criteria to determine whether to display a user control associated with an instant messaging capability, wherein the criteria includes the presence information associated with at least one user identifier of the plurality of user identifiers and at least one of a an email reply frequency, a number of user identifiers associated with the email thread, or a topic derived from contents of the at least one email; and in response to a selection of the user control, initiate a session of an instant messaging application with at least one user associated with the at least one user identifier In accordance with at least one aspect of the above system, the instructions, when executed by the processor, cause the user control to be disabled based on the presence information associated with at least one user identifier of the plurality of user identifiers. In accordance with at least one aspect of the above system, the presence information associated with at least one user identifier of the plurality of user identifiers is for user identifiers obtained from a "To:" field of the at least one email message. In accordance with at least one aspect of the above system, the instructions, when executed by the processor, cause the process to: extract a plurality of parameters from the email thread in response to a selection of the user control; generate a deep link including the extracted plurality of parameters; and initiate the session of the instant messaging application based on the extracted plurality of parameters included in the deep link. In accordance with at least one aspect of the above system, the extracted plurality of parameters includes a subject extracted from the at least one email, and the session of the instant messaging application associates the subject with a session group name. In accordance with at least one aspect of the above system, the presence information is displayed such that user identifiers associated with an available type of presence are displayed before user identifiers associated with an unavailable type of presence.

In accordance with at least one aspect of the present disclosure, a computer-readable storage medium is described. The computer-readable storage medium may include instructions, which when executed by a processor, cause the processor to: receive an email thread including at least one email; extract a plurality of user identifiers from the at least one email; obtain presence information associated with each user identifier of the plurality of user identifiers; order the plurality of user identifiers based on the presence information associated with each user identifier of the plurality of user identifiers; cause display of the ordered plurality of user identifiers together with an indication of the presence information associated with each user identifier; evaluate criteria to determine whether to display a user control associated with an instant messaging capability, wherein the criteria includes the presence information associated with at least one user identifier of the plurality of user identifiers; and in response to a selection of the user control, initiate a session of an instant messaging application with at least one user associated with the at least one user identifier.

In accordance with at least one aspect of the above computer-readable storage medium, the instructions, when executed by the processor, cause the user control to be disabled based on the presence information associated with at least one user identifier of the plurality of user identifiers. In accordance with at least one aspect of the above computer-readable storage medium, the criteria includes at least one of a an email reply frequency, a number of user identifiers associated with the email thread, or a topic derived from contents of the at least one email. In accordance with at least one aspect of the above computer-readable storage medium, the presence information associated with at least one user identifier of the plurality of user identifiers is for user identifiers obtained from a "To:" field of the at least one email message. In accordance with at least one aspect of the above computer-readable storage medium, the instructions, when executed by the processor, cause the process to: extract a plurality of parameters from the email thread in response to a selection of the user control; generate a deep link including the extracted plurality of parameters; and initiate the session of the instant messaging application based on the extracted plurality of parameters included in the deep link. In accordance with at least one aspect of the above computer-readable storage medium, the extracted plurality of parameters includes a subject extracted from the at least one email, and the session of the instant messaging application associates the subject with a session group name. In accordance with at least one aspect of the above computer-readable storage medium, the presence information is displayed such that user identifiers associated with an available type of presence are displayed before user identifiers associated with an unavailable type of presence.

In accordance with at least one aspect of the present disclosure, a system for initiating an instant messaging chat session from an email thread including at least one email is described. The system may include a processor; and memory including instructions which when executed by the processor, cause the processor to: receive an email thread including at least one email message; cause display of a user control associated with an instant messaging capability; in response to a selection of the user control: extract a plurality of parameters from the email thread; generate a deep link including the plurality of extracted parameters; and initiate a session of an instant messaging application based on the plurality of extracted parameters included in the deep link, wherein at least one parameter of the plurality of extracted parameters includes a subject parameter extracted from the email thread, and a session group name of the initiated session of the instant messaging application includes the subject parameter.

In accordance with at least one aspect of the above system, the instructions, when executed by the processor, cause the user control to be disabled based on presence information associated with at least one user identifier extracted from the at least one email thread. In accordance with at least one aspect of the above system the presence information associated with the at least one user identifier is for a user identifier obtained from a "To:" field of the at least one email message. In accordance with at least one aspect of the above system, the instructions, when executed by the processor, cause the process to: extract a plurality of user identifiers from the email message thread; obtain presence information associated with each user identifier of the plurality of user identifiers; order the plurality of user identifiers based on the presence information associated with each user identifier of the plurality of user identifiers; cause a display of the ordered plurality of user identifiers together with an indication of the presence information associated with each user identifier; and evaluate criteria to determine whether to display the user control associated with the instant messaging capability, wherein the criteria includes the presence information associated with at least one user identifier of the plurality of user identifiers. In accordance with at least one aspect of the above system, the instructions, when executed by the processor, cause the processor to display the user control associated with the instant messaging capability when the presence information associated with the at least one user identifier of the plurality of user identifiers displays an active indication. In accordance with at least one aspect of the above system, the criteria to determine whether to display the user control associated with the instant messaging capability includes at least one of a an email reply frequency, a number of user identifiers associated with the email thread, or a topic derived from contents of the at least one email. In accordance with at least one aspect of the above system, the presence information is caused to be displayed such that user identifiers associated with an available type of presence are displayed before user identifiers associated with an unavailable type of presence.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that does not depart from the broader scope of the claimed disclosure.

What is claimed is:

1. A method for initiating an instant messaging chat session from an email thread including at least one email, the method comprising:
receiving an email thread including at least one email;
extracting a plurality of user identifiers from the at least one email;
obtaining presence information associated with each user identifier of the plurality of user identifiers;
ordering the plurality of user identifiers based on the presence information associated with each user identifier of the plurality of user identifiers;
causing display of the ordered plurality of user identifiers together with an indication of the presence information associated with each user identifier;
evaluating criteria to determine whether to display a user control associated with an instant messaging capability, wherein the criteria includes the presence information associated with at least one user identifier of the plurality of user identifiers;
in response to a selection of the user control, extracting a plurality of parameters from the email thread;
generating a deep link including the extracted plurality of parameters; and
initiating a session of an instant messaging application based on the extracted plurality of parameters included in the deep link with at least one user associated with the at least one user identifier.

2. The method of claim 1, further comprising causing the user control to be disabled based on the presence information associated with at least one user identifier of the plurality of user identifiers.

3. The method of claim 2, wherein the criteria includes at least one of an email reply frequency, a number of user identifiers associated with the email thread, or a topic derived from contents of the at least one email.

4. The method of claim 2, wherein the presence information associated with at least one user identifier of the plurality of user identifiers is for user identifiers obtained from a "To:" field of the at least one email.

5. The method of claim 1, wherein the extracted plurality of parameters includes a subject extracted from the at least one email, and the session of the instant messaging application associates the subject with a session group name.

6. The method of claim 1, wherein the presence information is displayed such that user identifiers associated with an available type of presence are displayed before user identifiers associated with an unavailable type of presence.

7. A system for initiating an instant messaging chat session from an email thread including at least one email, the system comprising:
a processor; and
memory including instructions which when executed by the processor, cause the processor to:
receive an email thread including at least one email message;
cause display of a user control associated with an instant messaging capability;
in response to a selection of the user control:
extract a plurality of parameters from the email thread;
generate a deep link including the plurality of extracted parameters; and
initiate a session of an instant messaging application based on the plurality of extracted parameters included in the deep link, wherein at least one parameter of the plurality of extracted parameters includes a subject parameter extracted from the email thread, and a session group name of the initiated session of the instant messaging application includes the subject parameter.

8. The system of claim 7, wherein the instructions, when executed by the processor, cause the user control to be disabled based on presence information associated with at least one user identifier extracted from the at least one email thread.

9. The system of claim 8, wherein presence information associated with the at least one user identifier is for a user identifier obtained from a "To:" field of the at least one email message.

10. The system of claim 7, wherein the instructions, when executed by the processor, cause the process to:
extract a plurality of user identifiers from the email message thread;
obtain presence information associated with each user identifier of the plurality of user identifiers;
order the plurality of user identifiers based on the presence information associated with each user identifier of the plurality of user identifiers;
cause a display of the ordered plurality of user identifiers together with an indication of the presence information associated with each user identifier; and
evaluate criteria to determine whether to display the user control associated with the instant messaging capability, wherein the criteria includes the presence information associated with at least one user identifier of the plurality of user identifiers.

11. The system of claim 10, wherein the instructions, when executed by the processor, cause the processor to display the user control associated with the instant messaging capability when the presence information associated with the at least one user identifier of the plurality of user identifiers displays an active indication.

12. The system of claim 10, wherein the criteria to determine whether to display the user control associated with the instant messaging capability includes at least one of an email reply frequency, a number of user identifiers associated with the email thread, or a topic derived from contents of the at least one email.

13. The system of claim 7, wherein presence information is caused to be displayed such that user identifiers associated with an available type of presence are displayed before user identifiers associated with an unavailable type of presence.

14. A computer storage media including instructions, when executed by a processor, cause the processor to:

receive an email thread including at least one email;
extract a plurality of user identifiers from the at least one email;
obtain presence information associated with each user identifier of the plurality of user identifiers;
order the plurality of user identifiers based on the presence information associated with each user identifier of the plurality of user identifiers;
cause display of the ordered plurality of user identifiers together with an indication of the presence information associated with each user identifier;
evaluate criteria to determine whether to display a user control associated with an instant messaging capability, wherein the criteria includes the presence information associated with at least one user identifier of the plurality of user identifiers;
in response to a selection of the user control, extracting a plurality of parameters from the email thread;
generating a deep link including the extracted plurality of parameters; and
initiating a session of an instant messaging application based on the extracted plurality of parameters included in the deep link with at least one user associated with the at least one user identifier.

15. The computer storage media of claim 14, wherein the instructions, when executed by the processor, cause the user control to be disabled based on the presence information associated with at least one user identifier of the plurality of user identifiers.

16. The computer storage media of claim 15, wherein the criteria includes at least one of an email reply frequency, a number of user identifiers associated with the email thread, or a topic derived from contents of the at least one email.

17. The computer storage media of claim 14, wherein the extracted plurality of parameters includes a subject extracted from the at least one email, and the session of the instant messaging application associates the subject with a session group name.

18. The computer storage media of claim 14, wherein the presence information is displayed such that user identifiers associated with an available type of presence are displayed before user identifiers associated with an unavailable type of presence.

19. The computer storage media of claim 14, wherein the extracted plurality of parameters includes a subject extracted from the at least one email, and the session of the instant messaging application associates the subject with a session group name.

\* \* \* \* \*